United States Patent
Hosny et al.

(10) Patent No.: US 12,381,860 B2
(45) Date of Patent: Aug. 5, 2025

(54) SECURE TRANSMISSION OF SENSITIVE DATA OVER AN ELECTRONIC NETWORK

(71) Applicant: MASTERCARD INTERNATIONAL INCORPORATED, Purchase, NY (US)

(72) Inventors: Ahmed Hosny, Dublin (IE); Piyushkumar Kanubhai Hirpara, Dublin (IE); Karl Ingram, Dublin (IE); Ishfaq Lone, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 428 days.

(21) Appl. No.: 17/720,849

(22) Filed: Apr. 14, 2022

(65) Prior Publication Data

US 2022/0337567 A1 Oct. 20, 2022

(30) Foreign Application Priority Data

Apr. 16, 2021 (GB) .................................... 2105425

(51) Int. Cl.
*H04L 9/00* (2022.01)
*H04L 9/08* (2006.01)
(Continued)

(52) U.S. Cl.
CPC ........ *H04L 63/0442* (2013.01); *H04L 9/0827* (2013.01); *H04L 9/3247* (2013.01); *H04L 63/1441* (2013.01)

(58) Field of Classification Search
CPC . H04L 63/0442; H04L 9/0827; H04L 9/3247; H04L 63/1441; H04L 63/0807;
(Continued)

(56) References Cited

U.S. PATENT DOCUMENTS

2015/0088756 A1*  3/2015  Makhotin .............. G06Q 20/12
                                                                705/71
2015/0269566 A1    9/2015  Gaddam et al.
(Continued)

FOREIGN PATENT DOCUMENTS

EP     2933768 A1    10/2015
EP     3120310 A1     1/2017

OTHER PUBLICATIONS

International Search Report and Written Opinion for PCT/US2022/021089 mailed Jun. 22, 2022, 8 pages.

*Primary Examiner* — Syed M Ahsan
(74) *Attorney, Agent, or Firm* — Jordan IP Law, LLC

(57) ABSTRACT

The invention provides a method for transmission of sensitive information via an untrusted party. The sensitive information is held by a trusted computer and is transmitted via an untrusted computer to a recipient computer. Before transmission, the trusted computer encrypts the sensitive information using an encryption key that is associated with the recipient computer. The untrusted computer does not have access to a corresponding decryption key and is therefore unable to decrypt the sensitive information. The recipient computer is able to decrypt the encrypted sensitive information using a decryption key that it has access to and is thus able to gain access to the sensitive information without further communication with the trusted computer. This method has utility in payment transactions, particularly e-commerce transactions.

19 Claims, 7 Drawing Sheets

(51) Int. Cl.
*H04L 9/32* (2006.01)
*H04L 9/40* (2022.01)

(58) Field of Classification Search
CPC .............. H04L 63/126; H04L 2209/56; H04L 63/0428; H04L 63/18; H04L 63/062
See application file for complete search history.

(56) References Cited

U.S. PATENT DOCUMENTS

| | | |
|---|---|---|
| 2016/0099920 A1 | 4/2016 | Meuleman et al. |
| 2016/0224976 A1* | 8/2016 | Basu ..................... G06Q 20/02 |
| 2017/0270517 A1* | 9/2017 | Vasu .................. G06Q 20/4018 |
| 2017/0270519 A1* | 9/2017 | Purves ................. G06Q 20/385 |
| 2018/0167367 A1 | 6/2018 | Rhidian et al. |
| 2019/0288989 A1* | 9/2019 | John ..................... H04L 9/0891 |

* cited by examiner

SECURE TRANSMISSION OF SENSITIVE DATA OVER AN ELECTRONIC NETWORK

CROSS-REFERENCE TO RELATED APPLICATIONS

The present application claims priority to U.K. Provisional Patent Application No. 2105425.9 (filed on Apr. 16, 2021), which is hereby incorporated by reference in its entirety.

BACKGROUND

Many electronic data transmission systems exist in the modern digital world. In such systems it is often the case that sensitive information needs to be transmitted from a sender to a recipient via an intermediary.

In order to prevent the sensitive information from being compromised, the intermediary must be trusted by the sender and possibly also by the recipient. This places a significant burden on the intermediary as it must prove that it is trustworthy in order to participate in such information transfers. The intermediary must also guarantee that this trustworthiness is maintained over time. Additionally, the sender and possibly also the recipient are burdened with the task of identifying a trusted intermediary to enable communication between one another. Furthermore, the intermediary's computer systems must be configured to appropriately handle sensitive information, which may be complicated and costly both in terms of an initial configuration and on-going maintenance.

One context in which this situation arises is in e-commerce transactions, particularly those termed 'pay from account' transactions in which a payment is to be made from a customer bank account to a merchant bank account (e.g. via an Automated Clearing House, ACH, payment). The customer/user is typically interacting with a merchant computer via a user device (e.g. a mobile phone) in order to purchase goods or services. The merchant usually does not have the resources available to provide the necessary infrastructure itself to effect such payments and therefore must rely on a payment service provider to do this on its behalf. A payment service provider computer requires sensitive information in the form of the customer's payment account details (e.g. ACH details) in order to proceed with the transaction. The payment account details are usually stored securely by a trusted computer and the merchant computer must request these details from the trusted computer in order to provide them to the payment service provider computer.

In this arrangement the merchant computer is an intermediary between the sender of the sensitive information (trusted computer) and the receiver of the sensitive information (payment service provider computer). This arrangement can function in principle but it has a number of disadvantages.

Firstly, the merchant computer must be configured such that it can securely handle the sensitive information. This is possible in principle, but the configuration is time consuming and complicated and is often beyond the level of resources available to a typical merchant.

Secondly, the arrangement is vulnerable in the case of a compromised merchant computer. A merchant computer that is infected with malware, a virus, or otherwise compromised could leak sensitive information to an unauthorised party. Similarly, a computer posing as a merchant computer but actually being operated by an unauthorised party could also result in leakage of sensitive information.

A solution to this problem is to avoid transmitting the sensitive information to the merchant computer. Instead, the merchant computer can act as a relay between the trusted computer and the payment service provider computer to enable a direct communication channel to be established between the trusted computer and the payment service provider computer. Here, 'direct channel' means that the merchant computer is not involved in routing communications between the trusted computer and the payment service provider computer. The sensitive information can be sent from the trusted computer to the merchant computer over the direct channel, bypassing the merchant computer and thereby preventing the merchant computer from gaining access to the sensitive information.

This solution is not ideal, however. There is additional processing overhead involved in establishing the direct channel, as well as a delay introduced whilst data is exchanged over the direct channel, both of which can be particularly relevant in real-time or near real-time applications and/or high volume applications, such as e-commerce transactions. Additionally, the merchant computer has to be configured to manage this process, increasing the complexity of its configuration.

This solution is also potentially vulnerable to a replay attack in which a request is sent to the payment service provider to trigger the establishment of the direct channel and thereby execute a payment. However, this request is not genuine but instead uses credentials obtained from a previously performed request, i.e. the previous request is 'replayed'. This can cause a fraudulent transaction to be initiated. Steps can be taken to guard against such attacks but these come at the cost of increased configuration complexity and slower processing.

It would be desirable to have a solution that enables transmission of sensitive information between parties that addresses one or more of the problems noted above.

SUMMARY OF THE INVENTION

Broadly speaking the invention provides a method for transmission of sensitive information via an untrusted party. The sensitive information is held by a trusted computer and is transmitted via an untrusted computer to a recipient computer. Before transmission, the trusted computer encrypts the sensitive information using an encryption key that is associated with the recipient computer. Optionally, the trusted computer can also digitally sign the message including the encrypted sensitive information using a signature key associated with the trusted computer. This enables other parties such as the untrusted computer and/or the recipient computer to verify that the sensitive information has been encrypted by trusted computer and not some other party. A key feature of the invention is that the untrusted computer does not have access to a corresponding decryption key and is therefore unable to decrypt the sensitive information. The recipient computer is able to decrypt the encrypted sensitive information using a decryption key that it has access to and is thus able to gain access to the sensitive information without further communication with the trusted computer. If a digital signature has been applied, the recipient computer can also verify this signature, providing a further level of security. This method has utility in payment transactions, particularly e-commerce transactions. In this case the sensitive information can be cardholder information such as bank account details, the untrusted computer can be a merchant computer and the recipient computer can be a payment service provider computer.

In a first aspect the invention provides a computer-implemented method for transmission of sensitive information from a trusted computer to a recipient computer via an untrusted computer, the method comprising the trusted computer: a) receiving a first encryption key from the recipient computer via a first communication channel, wherein the untrusted computer does not have access to the first communication channel; b) storing the first encryption key in association with a unique identifier corresponding to the recipient computer; c) receiving a request for the sensitive information from the untrusted computer via a second communication channel, the request including the unique identifier; d) identifying the first encryption key based on the unique identifier; e) encrypting the sensitive information using the first encryption key; and f) transmitting a message including the encrypted sensitive information to the untrusted computer via the second communication channel; wherein the first encryption key is part of a key pair, the key pair including a second encryption key that is accessible by the recipient computer.

In a second aspect the invention provides a trusted computer comprising a processor and a memory, wherein the trusted computer is configured to perform the method of the first aspect.

In a third aspect the invention provides a system comprising a recipient computer, a trusted computer, an untrusted computer and a computer network providing a first communication channel between the trusted computer and the recipient computer and a second communication channel between the untrusted computer and the recipient computer, wherein the system is configured to perform the method of the first aspect.

In a fourth aspect the invention provides a computer-readable medium having instructions stored thereon which, when executed by one or more processors, cause the one or more processors to perform the method of the first aspect.

Preferred embodiments of the invention are set out in the appended dependent claims.

BRIEF DESCRIPTION OF THE DRAWINGS

Embodiments of the present invention are described below, by way of example only, with reference to the accompanying drawings, in which.

DETAILED DESCRIPTION

Figure 1:
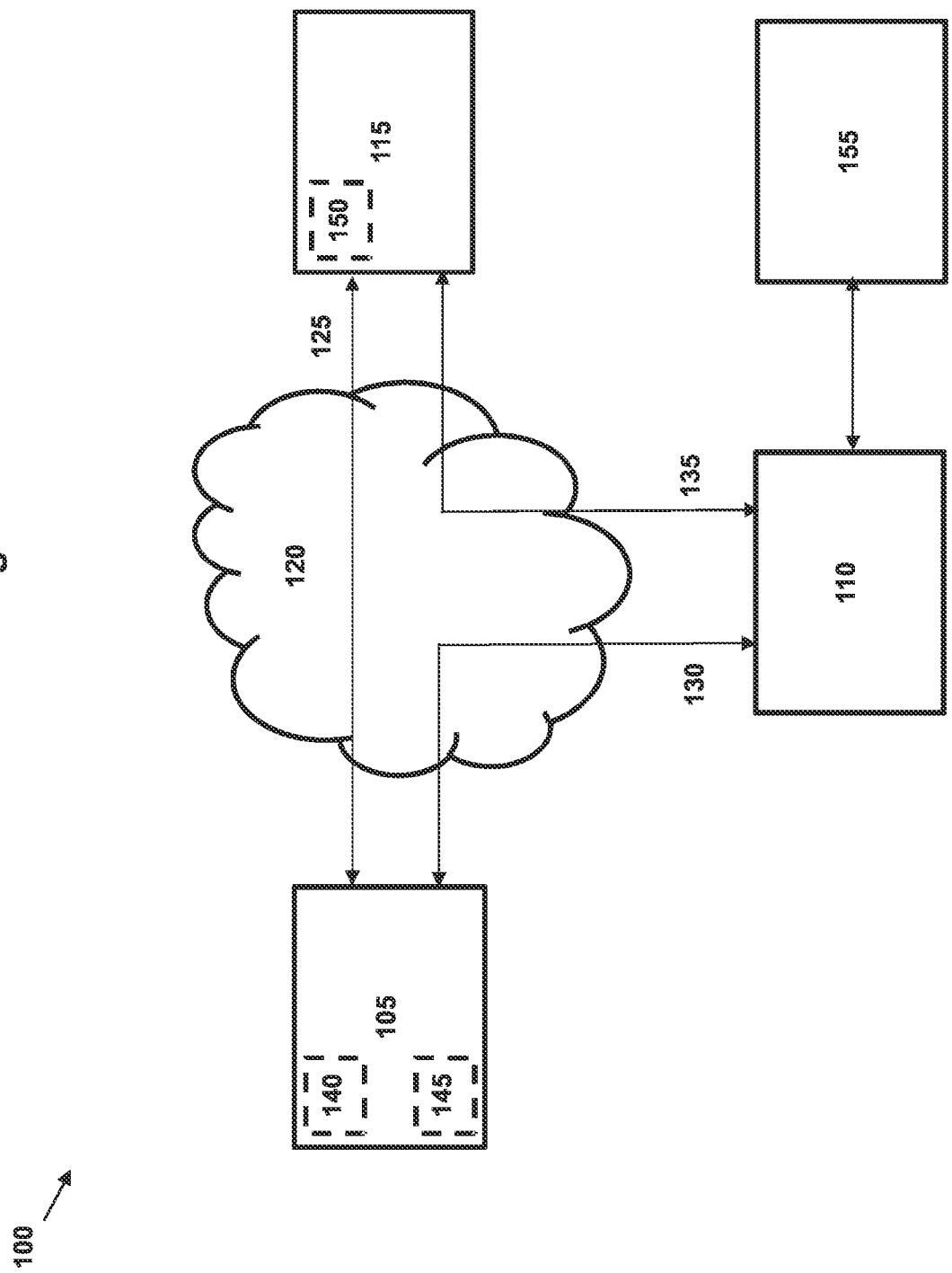
FIG. 1 is a schematic diagram of a system capable of implementing one or more processes according to the invention.
Figure 7:
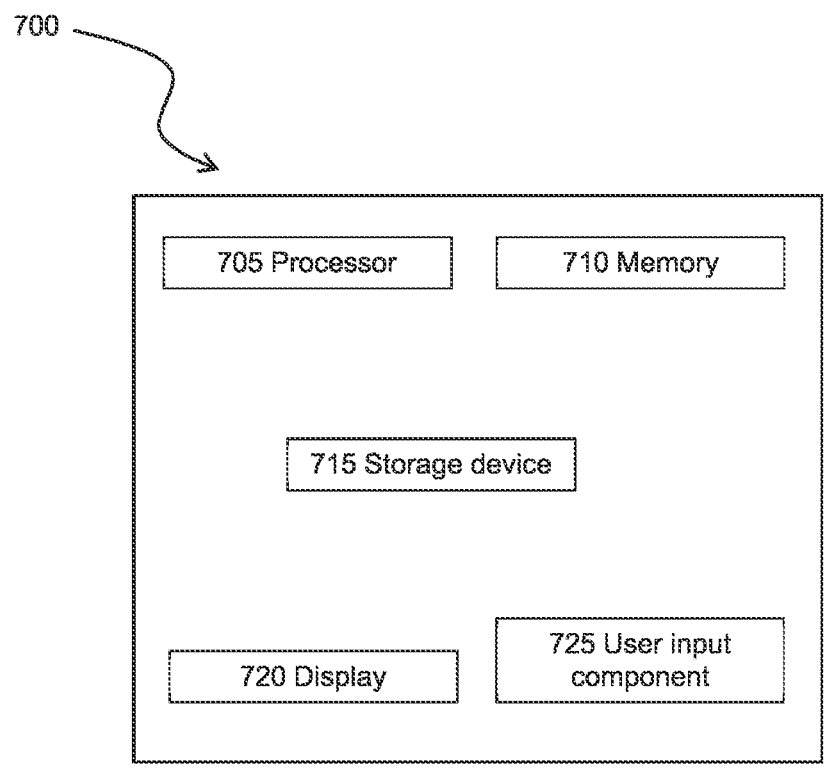
FIG. 7 is a schematic diagram of a computer capable of implementing one or more processes according to the invention.

FIG. 1 illustrates an exemplary system 100 that may perform one or more embodiments of the invention. System 100 includes a trusted computer 105, an untrusted computer 110 and a recipient computer 115. Each of trusted computer 105, untrusted computer 110 and recipient computer 115 can include one or more processors and a memory as is known in the art per se (see also FIG. 7).

The term 'trusted computer' as used herein is understood as meaning a computer that is known to be secure and thereby able to store and process sensitive information without risk of it being compromised. A trusted computer may implement a trusted execution environment, for example. A trusted computer may implement and conform to an industry standard in data security, for example the Payment Card Industry Data Security Standard (PCI-DSS). In the context of electronic payments, the trusted computer could be an access control server (ACS).

The term 'untrusted computer' as used herein is understood to mean a computer that is not considered to be secure such that it is not able to store and process sensitive information without risk to the security of the sensitive information. An untrusted computer can therefore be implemented by any data processing device without any particular requirements on the security of said data processing device. It will thus be appreciated that the configuration and maintenance of untrusted computer 110 is relatively simple, particularly compared to a computer that must be secure. In the context of electronic payments, the untrusted computer could be a merchant computer.

A 'recipient computer' is understood to be a computer that is to be the recipient of sensitive information. In the context of the present invention, recipient computer 115 receives the sensitive information via untrusted computer 110. Recipient computer 115 is then able to take some action based on the sensitive information—for example, initiate an electronic transaction that makes use of the sensitive information. In the context of electronic payments, the recipient computer could be a payment service provider computer. A payment service provider is an entity that provides payment services on behalf of another party such as a merchant.

A network 120 is also present. Network 120 provides a first communication channel 125 between trusted computer 105 and recipient computer 115. Network 120 also provides a second communication channel 130 between untrusted computer 110 and trusted computer 105. Network 120 may additionally provide a third communication channel 135 between untrusted computer 110 and recipient computer 115.

Although a single network is shown as providing all necessary communication channels, the invention is not limited to this and it is possible for each communication channel to be provided by a different network.

As can be seen from FIG. 1, untrusted computer 110 does not have access to the first communication channel 125. This means that untrusted computer 110 is not able to access data packets traversing communication channel 125.

Network 120 can be any computer network that is capable of enabling data exchange between two computers. Network 120 may be a packet switched network, a circuit switched network, or a combination of the two, for example. Network 120 could be the internet. Network 120 can include a cellular network component, or network 120 can be a cellular network. Other variations will be apparent to a skilled person having the benefit of the present disclosure.

Any one or more of trusted computer 105, untrusted computer 110 and recipient computer 115 may be cloud-based computers. The functionality of said computers may be provided by one or more virtual machines executing within a data centre. Cloud-based computing and virtual machines are known in the art per se and therefore they are not described in further detail here.

Trusted computer 105 has access to sensitive information 140. Sensitive information 140 may be stored on a storage device that is either part of trusted computer 105 or external to trusted computer 105 but which trusted computer 105 has access to, e.g. via a storage area network (not shown).

Trusted computer 105 also has access to a first encryption key 145 which can be stored in the same manner as sensitive information 140. First encryption key 145 is provided to trusted computer 105 via first communication channel 125 in the manner described below in connection with FIG. 3.

Recipient computer 115 has access to a second encryption key 150. Second encryption key 150 may be stored on a storage device that is either part of recipient computer 115 or external to recipient computer 115 but which recipient computer 115 has access to, e.g. via a storage area network (not shown).

First encryption key 145 and second encryption key 150 form a key pair. This means that data encrypted using first encryption key 145 can be decrypted using second encryption key 150. The key pair may be a symmetric key pair or an asymmetric key pair. In the case of an asymmetric key pair, first encryption key 145 is the public key of the key pair and second encryption key 150 is the private key of the key pair.

Untrusted computer 110 can be communicatively coupled with a user device 155. User device 155 can perform an action that causes untrusted computer 110 to need to make use of sensitive information 140. Specifically, a request may be transmitted by user device 155 to untrusted computer 110, the request being such that untrusted computer 110 is required to serve as an intermediary for transmitting sensitive information 140 from trusted computer 105 to recipient computer 115. This is described in further detail below in connection with FIG. 6.

System 100 can operate in any environment where it is desirable to securely transmit sensitive information from trusted computer 105 to recipient computer 115 via untrusted computer 110. For example, system 100 can operate in an electronic payment (e-commerce) environment. In this context, untrusted computer 110 is a merchant computer, recipient computer 115 is a payment service provider computer, trusted computer 150 is an access control server (ACS) and sensitive information 140 is an account identifier associated with a bank account, e.g. automated clearing house (ACH) details. User device 155 can be a customer device such as a mobile phone, tablet, desktop or laptop computer, smart television, games console, etc.

In this case, the user device may request that the merchant computer performs a financial transaction to enable a user to effect a payment to the merchant. In order to complete the transaction, the merchant computer must provide the account identifier associated with the user's bank account to the payment service provider computer. The merchant computer has to act as an intermediary for this process as neither the payment service provider computer nor the ACS are in communication with the user device and hence do not have knowledge of the user's desire to conduct a transaction.

As will be apparent from this specification, the invention enables the merchant computer to obtain the account identifier in encrypted form from ACS and to pass this on to the payment service provider computer. Only the payment service provider computer can decrypt the encrypted account identifier, meaning that the merchant does not need to demonstrate that the merchant computer is correctly configured to handle sensitive data. Moreover, a compromised merchant computer will not be a security risk because the merchant computer never has access to the account identifier in unencrypted form, nor does the merchant computer ever have access to a decryption key for decrypting the encrypted account identifier.

Figure 2:
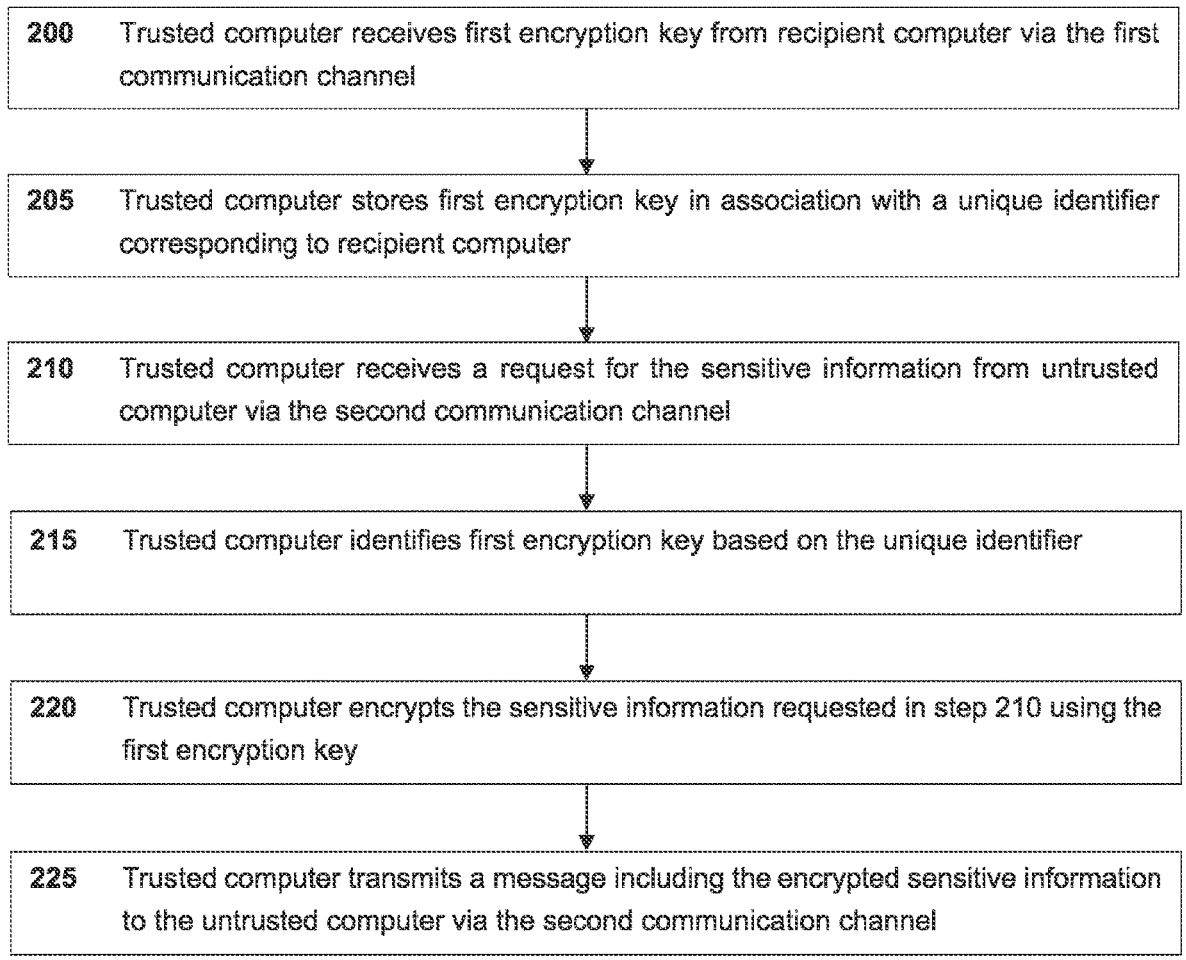
FIG. 2 is a flow diagram depicting a computer-implemented method for transmission of sensitive information according to the invention from the perspective of a trusted computer.

Referring now to FIG. 2, a computer-implemented method for transmission of sensitive information according to the invention is shown. The method of FIG. 2 is described from the perspective of trusted computer 105 and can be implemented by trusted computer 105.

In step 200, trusted computer 105 receives first encryption key 145 from recipient computer 115 via the first communication channel 125. As explained earlier, untrusted computer 110 does not have access to the first communication channel 125.

Following receipt of first encryption key 145, in step 205 trusted computer 105 stores first encryption key 145 in association with a unique identifier corresponding to recipient computer 115. The unique identifier could be, for example, a MAC address of recipient computer 115, or a string of characters assigned to recipient computer 115. The string of characters may be human readable or randomly generated. Other suitable unique identifiers will be apparent to the skilled person. The unique identifier functions to enable trusted computer 105 to unambiguously determine that first encryption key 145 is associated with recipient computer 115.

In step 210, trusted computer 105 receives a request for sensitive information 140 from untrusted computer 110 via the second communication channel 130, the request including the unique identifier. It will be appreciated that a significant amount of time may elapse between steps 205 and 210—for example, hours, days, weeks, or even months. The request could be made using an Application Programming Interface (API) supported by trusted computer 105 and untrusted computer 110, for example. The request may include an identifier corresponding to the sensitive information 140 such as a unique user identity value.

In step 215, trusted computer 105 identifies first encryption key 145 based on the unique identifier that was included in the request for sensitive information 140 in step 210. Trusted computer 105 may identify first encryption key 145 by extracting the unique identifier from the request and performing a lookup in a database that contains a list of unique identifiers stored in association with respective encryption keys. If the unique identifier cannot be found, or the unique identifier can be found but there is no encryption key associated with it, trusted computer 105 may return an error to untrusted computer 110.

In step 220, trusted computer 105 encrypts sensitive information 140 requested in step 210 using first encryption key 145. As first encryption key 145 is part of a key pair, it is possible to decrypt the encrypted sensitive information using second encryption key 150 that is accessible by recipient computer 115. The encryption can be performed using any known encryption technique.

Optionally, in step 220 trusted computer 105 can digitally sign the message including the encrypted sensitive information using a signature key associated with trusted computer 105. The signature key can be stored in the same manner as first encryption key 145. Applying a digital signature in this way enables untrusted computer 110 and/or recipient computer 115 to verify that the sensitive information has been encrypted by trusted computer 105 and not some other party.

In step 225, trusted computer 105 transmits a message including the encrypted sensitive information to untrusted computer 110 via the second communication channel 130. This message is responsive to the request for sensitive information 140 from untrusted computer 110 as received by trusted computer 105 in step 205. The request made by untrusted computer 110 has thus been satisfied. However, since untrusted computer 110 only has access to the sensitive information in encrypted form, it is not necessary for untrusted computer 110 to guarantee any particular level of security in order to participate in this process. This advantageously reduces the complexity of configuring and maintaining untrusted computer 110.

Additionally, since untrusted computer 110 does not have access to first encryption key 145 or second encryption key 150, it is not possible for untrusted computer 110 to decrypt the encrypted sensitive information. Therefore, if untrusted computer 110 is compromised in some way (e.g. via malware) or is operated by a nefarious party, the security of sensitive information 140 is not at risk as the most that can be stolen is the encrypted version of the sensitive information.

Figure 3:
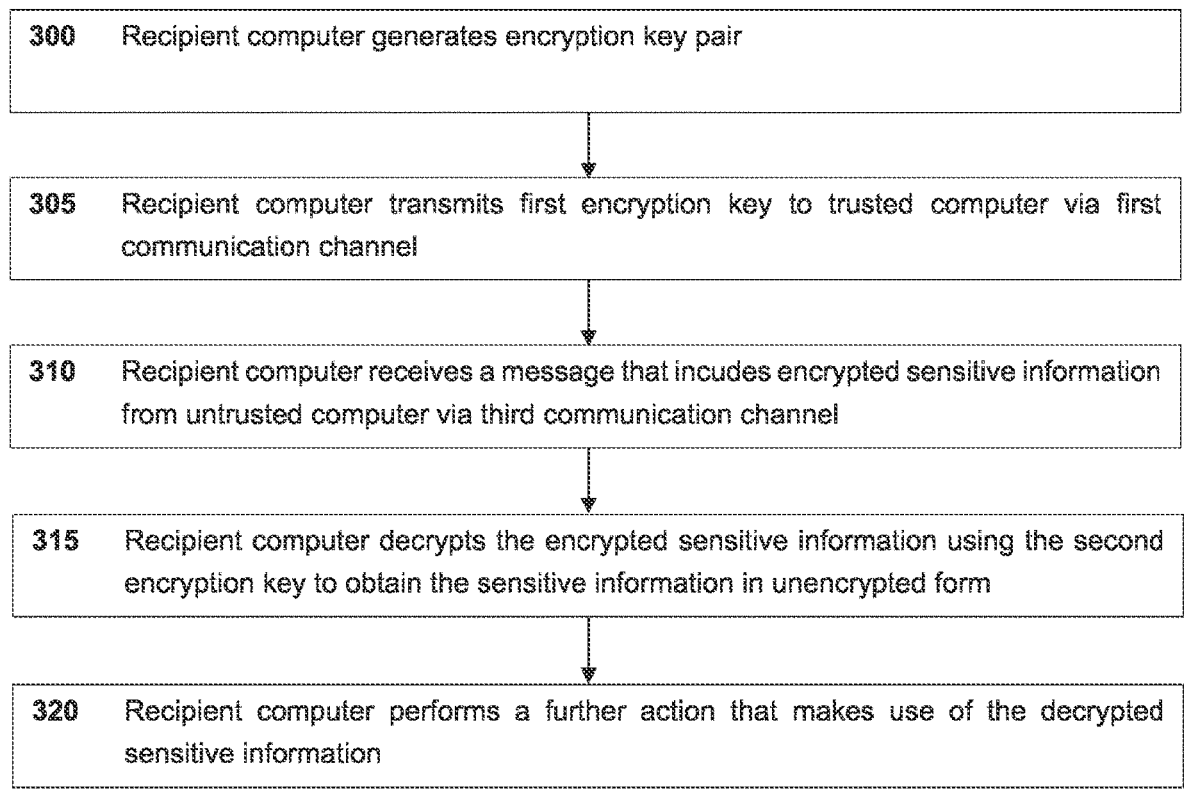
FIG. 3 is a flow diagram depicting a computer-implemented method for transmission of sensitive information according to the invention from the perspective of a recipient computer.

Moving on now to FIG. 3, a computer-implemented method for transmission of sensitive information according to the invention is shown. The method of FIG. 3 is described from the perspective of recipient computer 115 and can be implemented by recipient computer 115.

In step 300, recipient computer 115 generate a key pair comprising first encryption key 145 and second encryption key 150. The key pair can be a symmetric or asymmetric key pair. Any known technique for generating a key pair can be used by recipient computer 115 when performing step 300.

In step 305, recipient computer 115 transmits first encryption key 145 to trusted computer 105 via first communication channel 125. This step should be understood to be complementary to step 200 of FIG. 2. It will also be appreciated that steps 300 and 305 occur before step 200 of FIG. 2. As untrusted computer 110 does not have access to first communication channel 125, and indeed has no knowledge of first communication channel 125, it cannot gain access to first encryption key 145. Second encryption key 150 is not transmitted over network 120 by recipient computer 115 and so untrusted computer 110 also cannot gain access to second encryption key 150.

In step 310, recipient computer 115 receives a message that includes encrypted sensitive information from untrusted computer 110 via third communication channel 135. This message may be referred to as comprising a 'token', where in some cases the message itself is the token. The token may take the form of, or include, a structured data package such as a JSON Web Token (JWT) as is known in the art per se. As is known in the art, a JWT can have associated with it one or more claims that contain information asserted about a subject. The message may include any one or more of the following fields, in any combination, with exemplary field contents being shown in brackets:

Trusted computer unique identifier field (text string)
Message expiration date field (datetime/timestamp/UTC value)
Message identifier field (text string/integer)
Encrypted sensitive information field (encrypted text string)
Subject associated with the claim of the JWT (text string)
Audience for the JWT claim (text string, typically specifying either recipient computer or untrusted computer)
Issue time of JWT claim (datetime/timestamp/UTC value)
Not before time field (datetime/timestamp/UTC value, specifying earliest time at which claim data can be used)

The message additionally or alternatively includes an account details object. The account details object includes the sensitive information, and may also include any one or more of the following fields in any combination:

User identifier (text string, unique identifier associated with a user—could be a customer identifier)
Account identifier (text string, unique identifier associated with a user account—could be an identifier corresponding to a financial account)
Balance (number, balance of a financial account)
Account name (text string, descriptor for user account—e.g. bank account name)
Account type (text string/number, descriptor for type of user account, e.g. bank account type)

The encrypted sensitive information referenced throughout this specification can take the form of an encrypted version of the account details object.

In step 315, recipient computer 115 decrypts the encrypted sensitive information received in step 310 using second encryption key 150 to obtain the sensitive information in unencrypted form. The unencrypted sensitive information is therefore now available to recipient computer 115 for use in a further action. If a digital signature has been applied to the message, step 315 can optionally include verifying the digital signature. If the digital signature cannot be verified, recipient computer 115 stops the process of FIG. 3 and may raise an error indicative of the fact that the digital signature could not be verified.

In step 320, recipient computer 115 performs a further action that makes use of the decrypted sensitive information. The further action could be, for example, initiating a transaction using the sensitive information in its unencrypted form. The transaction could be a financial transaction, for example.

Figure 4:
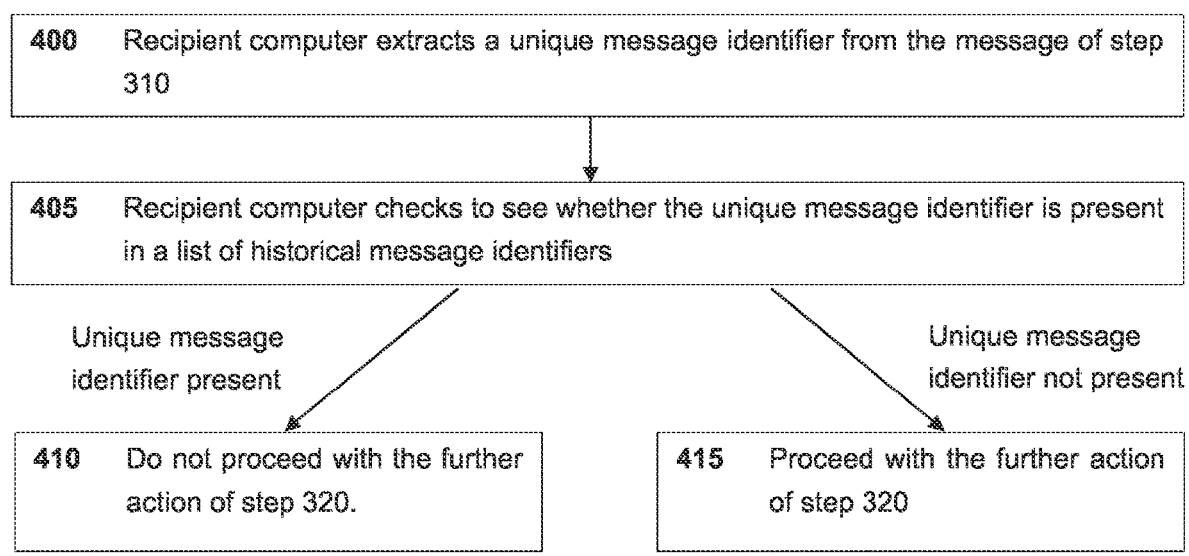
FIG. 4 is a flow diagram depicting an embodiment of the computer-implemented method of FIG. 3.

Before the further action of step 320 is performed, recipient computer 115 can optionally perform a replay attack check according to the steps of FIG. 4. The replay attack check serves to prevent a replay attack from being successfully carried out. A replay attack is where an unauthorised party gains access to a key piece of data such as the token discussed above and attempts to use this data at a later date to simulate a valid action, e.g. attempting to re-use a token to trigger a second, subsequent transaction that is not genuine. At the core of the replay attack stratagem is the use of valid data (e.g. a valid token) corresponding to an earlier legitimate transaction, meaning that the likelihood of the system accepting the replay attack as genuine is, in principle, increased.

In step 400, recipient computer 115 extracts a unique message identifier from the message that was received in step 310 of FIG. 3. In the case where the message includes a token, the unique message identifier could be extracted from a message identifier field of the token. The unique message identifier can be, for example, a string of randomly generated characters or a number.

In step 405, recipient computer 115 checks to see whether the unique message identifier is present in a list of historical message identifiers. This list includes unique message identifiers respectively corresponding to all messages or tokens that recipient computer 115 has previously received. The list may include additional information such as a timestamp corresponding to the date and time that recipient computer 115 received the associated message and/or an origin identifier (e.g. an IP address) that enables the identity of the sender of the message (e.g. untrusted computer 110) to be determined.

In the case where the unique message identifier from the message received in step 310 is found in the list of historical message identifiers, the recipient computer 115 moves to step 410 and does not initiate the further action of step 320. This could involve, for example, not initiating an electronic transaction. This is because the appearance of the unique message identifier in the list of historical message identifiers indicates that a replay attack attempt may have been made. In addition to not initiating the further action of step 320, recipient computer 115 may perform a remedial action including any one or more of:

- raising an alarm with a system administrator or other such party or system of responsibility;
- logging information such as the date and time of the message, the message sender IP address and/or the unique message identifier in a log;
- blacklisting the unique message identifier such that it is no longer accepted as a valid message identifier;
- blacklisting the sender of the message such that recipient computer 115 will no longer process messages received from the sender;
- breaking third communication channel 135 and optionally subsequently re-establishing the communication channel using a different network path and/or new security settings (e.g. starting a new SSL or TLS session).

In the case where the unique message identifier from the message received in step 310 is not found in the list of historical message identifiers, the recipient computer 115 moves to step 415 and goes ahead with the further action of step 320. This could be, for example, initiating a transaction. This is because in this set of circumstances there is no evidence that a replay attack is being attempted. The unique message identifier is also preferably added to the list of historical message identifiers to guard against a future replay attack attempt using the current message or token.

Figure 5:
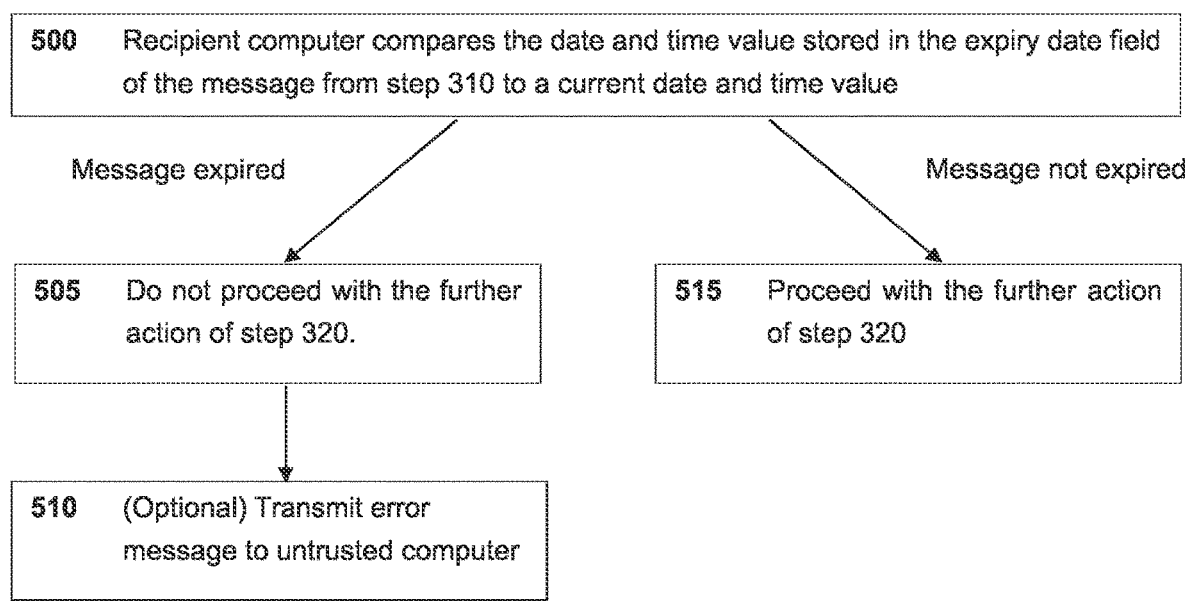
FIG. 5 is a flow diagram depicting another embodiment of the computer-implemented method of FIG. 3.

In addition to the process of FIG. 4, or as an alternative to this process, before initiating the further action of step 320 recipient computer 115 can perform the steps shown in FIG. 5 and described immediately below. In this embodiment, the message received in step 310 includes an expiry date field containing a date and time value. This is referred to as an 'expiry date'. The expiry date can be encoded in any format suitable for storing date and time information, e.g. UTC format. The expiry date field could be, for example, included in a token that forms part or all of the message as described above. The steps of FIG. 5 can serve as a defence against a replay attack as they prevent a message from remaining live indefinitely. A live message is one that is usable to trigger the further action of step 320, for example usable to trigger an electronic transaction. By forcing a message to expire after a certain time, the time window in which a replay attack can be successful is reduced, thereby reducing the chance of the replay attack succeeding.

The expiry date of the message can be set according to the requirements of the specific implementation in which the invention is embodied. The expiry date is typically selected as a date and time that is a specific amount of time in the future relative to the moment at which the message is created. This may be referred to as the 'message lifetime'. Exemplary values for the message lifetime include: 10 seconds, 30 seconds, 1 minute, 5 minutes, 8 minutes, 10 minutes, 30 minutes, 1 hour, 12 hours, 1 day, 1 week, etc. Preferably the message lifetime is set so that the message remains live for long enough to trigger the further action of step 320, but not significantly longer than the time that is expected to be required to trigger the further action of step 320. This strikes the right balance between ensuring that the message is usable to trigger the further action of step 320 without allowing messages to remain live, and therefore usable in a replay attack, for excessive amounts of time.

In step 500, recipient computer 115 compares the date and time value stored in the expiry date field of the message from step 310 to a current date and time value, the current date and time value corresponding to a date and time at which the recipient computer is performing processing of the message. The current date and time value can be obtained using a system function or call, e.g. datetime.now( ) in some programming languages. The expiry date can be stored in an expiry date field of the message. The expiry date can be set by trusted computer 105 or untrusted computer 110. Preferably, the expiry date is set by trusted computer 105, perhaps as part of step 225 of FIG. 2.

Following step 500, recipient computer 115 proceeds to either step 505 or step 515 depending on the results of the comparison. In the case where the expiry date of the message is earlier than the current date and time value, i.e. the message has expired, recipient computer 115 proceeds to step 505 and ceases processing of the message. That is, in this case recipient computer 115 will not perform the further action of step 320. Optionally, recipient computer 115 may proceed to step 510 and transmit an error message to untrusted computer 110.

In the case where the expiry date of the message is equal to, or later than, the current date and time value, i.e. the message has not expired, recipient computer 115 moves to step 515 and proceeds with the further action of step 320. For example, in this case recipient computer 115 could initiate a transaction involving the decrypted sensitive information. This embodiment of the invention thus prevents expired messages from being used in a replay attack.

Figure 6:
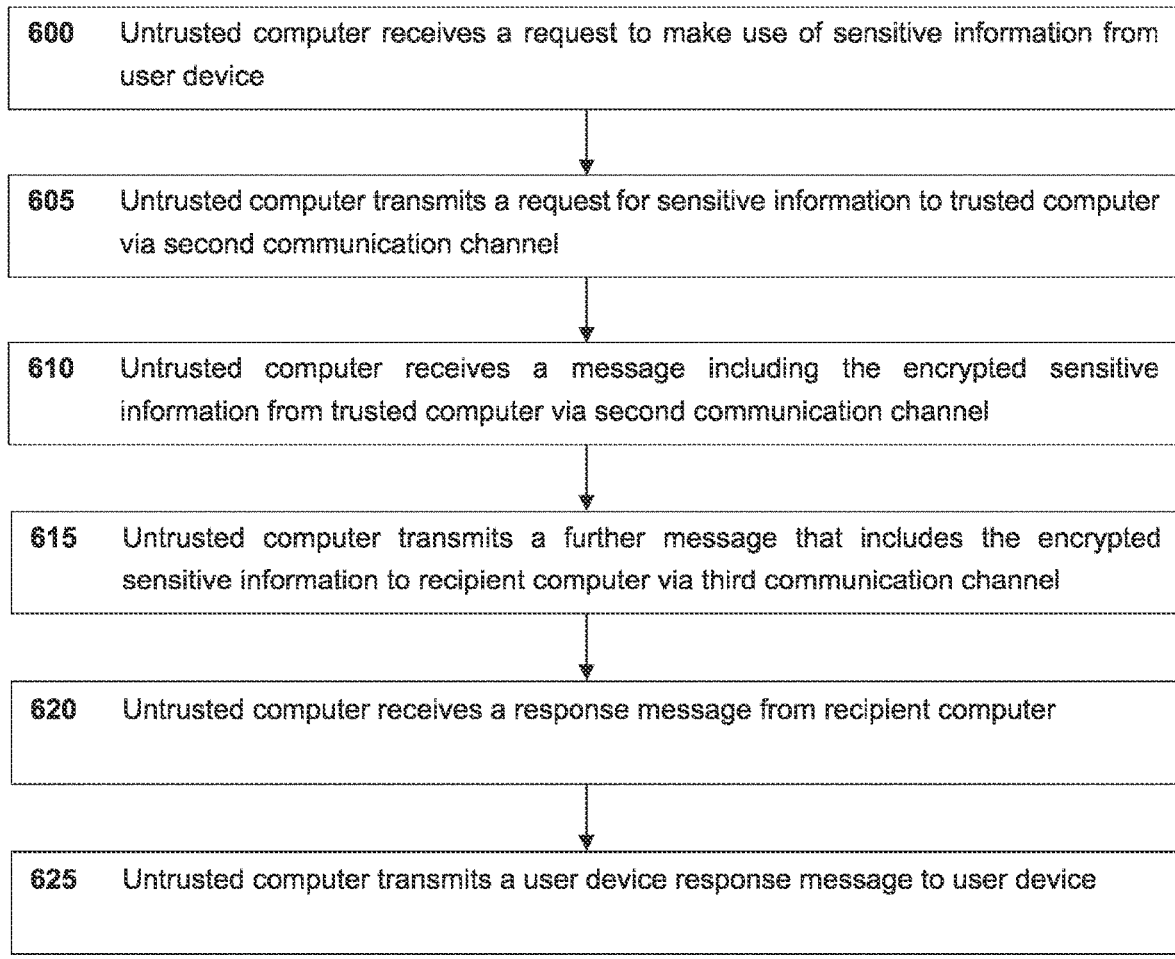
FIG. 6 is a flow diagram depicting a computer-implemented method for transmission of sensitive information according to the invention from the perspective of an untrusted computer.

Turning now to FIG. 6, a computer-implemented method for transmission of sensitive information according to the invention is shown. The method of FIG. 6 is described from the perspective of untrusted computer 110 and can be implemented by untrusted computer 110.

In step 600, untrusted computer 110 receives a request to make use of sensitive information 140 from user device 155. This request could be a request for a merchant operating untrusted computer 110 to perform an e-commerce transaction on behalf of a user of user device 155 so as to enable the user to make a payment to the merchant in exchange for goods and/or services. The request could include, for example, payment details entered by the user into a website operated by or on behalf of the merchant. The payment details could include user identification information such as any combination of a name, address, username, telephone number, email address, biometric data, user identification number and/or other such information that enables the user to be identified.

In step 605, untrusted computer 110 transmits a request for sensitive information 140 to trusted computer 105 via second communication channel 130. The request may be transmitted via an API, for example. The request includes at least the unique identifier corresponding to recipient computer 115. The request could include a unique user identity value that identifies the user and/or user device 155. The unique user identity value could comprise, or be based on, one or more of the payment details listed in the immediately preceding paragraph. The unique user identity value may be usable by trusted computer 105 to determine that sensitive information 140 is sought by untrusted computer 110, e.g. to enable sensitive information 140 to be identified and extracted from a database containing many items of sensitive data. It will be understood that step 605 is complementary to step 210 of FIG. 2.

In step 610, untrusted computer 110 receives a message including the encrypted sensitive information from trusted computer 105 via second communication channel 130. It will be understood that step 610 is complementary to step 225.

In step 615, untrusted computer 110 transmits a further message that includes the encrypted sensitive information to recipient computer 115 via third communication channel 135. The further message could be a request to initiate a transaction using sensitive information 140, which may be referred to as an authorisation request message. The further message can be in the form of, or comprise, a JWT as discussed above in connection with step 310. It will be understood that step 615 is complementary to step 310.

In step 620, untrusted computer 110 receives a response message from recipient computer 115, the response message providing the recipient computer's response to the further message transmitted in step 615. The response message could be a result of the further action performed by recipient computer 115 in step 320. In the case where the further message is a request to initiate a transaction using sensitive information 140, the response message could be an authorisation response message indicating whether the transaction has been approved or declined.

In step 625, untrusted computer 110 transmits a user device response message to user device 155. The user device response message is based upon the response message received from recipient computer 115. In the case where the response message received from recipient computer 115 is an authorisation response message, the user device response message can indicate whether the transaction was approved or declined.

It will be appreciated that the complementary nature of FIGS. 2 to 6 means that the processes depicted can be performed in tandem with one another to provide a system that operates to perform a service requested by user device 155 in a secure manner. There is no need for a direct channel between trusted computer 105 and recipient computer 115 to be established each time sensitive information 140 is to be used. This avoids the overhead involved in establishing the direct channel, as well as a delay introduced whilst data is exchanged over the direct channel. There is also no need for untrusted computer 110 to support any particular security standard or have any particular configuration, reducing the time and complexity involved in setting up and maintaining untrusted computer 110. Sensitive information 140 is also not at risk should untrusted computer 110 be compromised, e.g. by malware. The invention can be used, for example, to effect a payment on behalf of a user of user device 155. The payment can be effected securely, and in particular the security of sensitive information such as ACH details can be guaranteed.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the scope of the claims.

It will be appreciated that embodiments of the invention, or sub-aspects thereof, can be implemented using a computer. An exemplary computer 700 is shown in schematic form in FIG. 7. Computer 700 includes a processor 705 and memory 710. Processor 705 can be a single core or multi-core processor, or a distributed processing cluster such as may be found in a cloud computing environment. Memory 710 is a volatile memory such as Random Access Memory (RAM). Such components are known per se and hence are not described in detail here.

Computer 700 also includes a storage device 715 which is a non-volatile storage device of the type known in the art per se. Storage device 715 can be part of computer 700 or it may be remote from computer 700 and accessible via a network such as a storage area network. Storage device 715 is suitable for storing items such as sensitive information 140.

In some circumstances, such as in the case of user device 155, computer 700 can include a display 720 and a user input component 725. In some cases these functions may be provided by a single component, e.g. a touchscreen. Display 720 and user input component 725 can be omitted in the case of 'back end' uses for computer 700, e.g. in the case of trusted computer 105, untrusted computer 110 and/or recipient computer 715.

Any and all of the methods described herein can be encoded into computer-readable instructions and stored on a computer-readable medium, e.g. a non-transitory computer-readable medium. Computer 700 can access such a computer-readable medium to cause processor 705 to execute said instructions so as to cause computer 700 to implement any of the methods described herein or any one or more of their constituent steps.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Variations on the embodiments described herein will be apparent to a person skilled in the art having the benefit of the present disclosure. Such variations are also within the scope of the claims. At times the invention has been described in the context of a method having method steps. Unless expressly indicated otherwise, such steps can be executed in any order and may be executed in parallel or sequentially. Steps can be omitted or combined unless otherwise indicated.

The invention claimed is:

1. A computer-implemented method for transmission of sensitive information from a trusted computer to a recipient computer via an untrusted computer, the method comprising the trusted computer:
   a) receiving a first encryption key from the recipient computer via a first communication channel, wherein the untrusted computer does not have access to the first communication channel;
   b) storing the first encryption key in association with a unique identifier corresponding to the recipient computer;
   c) receiving a request for the sensitive information from the untrusted computer via a second communication channel, the request including the unique identifier;
   d) identifying the first encryption key based on the unique identifier;
   e) encrypting the sensitive information using the first encryption key;
   f) transmitting a message including the encrypted sensitive information to the untrusted computer via the second communication channel;
   wherein the first encryption key is associated with a second encryption key that is accessible by the recipient computer, wherein the first and second encryption keys form a symmetric key pair or an asymmetric key pair, and wherein the untrusted computer is unable to access the second encryption key,
   wherein the method further comprises, by the recipient computer:
   g) receiving the message including the encrypted sensitive information from the untrusted computer via a third communication channel that is established between the untrusted computer and the recipient computer; and
   h) decrypting the encrypted sensitive information using the second encryption key to obtain the sensitive information in an unencrypted form.

2. The computer-implemented method of claim 1, wherein step e) further comprises, by the trusted computer:
   digitally signing the message including the encrypted sensitive information using a signature key associated with the trusted computer.

3. The computer-implemented method of claim 1, further comprising, by the recipient computer, before the receiving the first encryption key:
   generating the symmetric key pair or the asymmetric key pair; and
   transmitting the first encryption key to the trusted computer via the first communication channel.

4. The computer-implemented method of claim 1, further comprising, by the recipient computer:
   initiating a transaction using the sensitive information in unencrypted form.

5. The computer-implemented method of claim 4 wherein further comprising, before initiating the transaction, the recipient computer:
   extracting a unique message identifier from the message; and
   checking to see whether the unique message identifier is present in a list of historical message identifiers;
   wherein, in the case where the unique message identifier is found in the list of historical message identifiers, the recipient computer does not initiate the transaction; and
   wherein, in the case where the unique message identifier is not found in the list of historical message identifiers, the recipient computer proceeds to initiate the transaction.

6. The computer-implemented method of claim 1, further comprising, by the untrusted computer:
   receiving a sensitive information identifier associated with the sensitive information;
   generating the request for the sensitive information, the request including the sensitive information identifier; and
   transmitting the request for the sensitive information over the second communication channel.

7. The computer-implemented method of claim 6, wherein the sensitive information identifier is an account identifier associated with a bank account.

8. The computer-implemented method of claim 6, wherein the sensitive information identifier is automated clearing house details.

9. The computer-implemented method of claim 1, wherein the sensitive information comprises account details associated with a bank account, the untrusted computer is a merchant computer, the trusted computer is an access control server and the recipient computer is a payment service provider computer,
   wherein the first and second encryption keys form the asymmetric key pair, the first encryption key is a public key and the second encryption key is a private key.

10. The computer-implemented method of claim 1, wherein the message further includes an expiry date field that contains a date and time value, the method further comprising, by the recipient computer:
    comparing the date and time value to a current date and time value, the current date and time value corresponding to a date and time at which the recipient computer is performing processing of the message; and
    based on the comparison, in the case where the date and time value is earlier than the current date and time value, ceasing processing of the message.

11. The computer-implemented method of claim 10, further comprising:
    in the case where the date and time value is earlier than the current date and time value, transmitting an error message to the untrusted computer.

12. A system comprising:
    a recipient computer;
    a trusted computer comprising:
    a trusted processor; and
    a trusted memory, wherein the trusted processor is to execute instructions to cause the trusted computer to:
    receive a first encryption key from the recipient computer via a first communication channel, wherein the trusted computer transmits information to the recipient computer via an untrusted computer and wherein the untrusted computer does not have access to the first communication channel;
    store the first encryption key in association with a unique identifier corresponding to the recipient computer in the memory;
    receive a request for the information from the untrusted computer via a second communication channel, the request including the unique identifier;
    identify the first encryption key based on the unique identifier;
    encrypt the information using the first encryption key; and
    transmit a message including the encrypted information to the untrusted computer via the second communication channel;
    wherein the first encryption key is associated with a second encryption key that is accessible by the recipient computer, wherein the first and second encryption keys form a symmetric key pair or an asymmetric key pair, wherein the untrusted computer is unable to access the second encryption key, wherein the recipient computer comprises
  a recipient processor; and
  a recipient memory, wherein the recipient processor is to execute instructions to cause the recipient computer to:
    receive the message including the encrypted information from the untrusted computer via a third communication channel that is established between the untrusted computer and the recipient computer; and
    decrypt the encrypted information using the second encryption key to obtain the information in an unencrypted form.

13. Non-transitory, computer-readable mediums of a trusted computer and a recipient computer, the computer-readable mediums having instructions stored thereon which, when executed by processors, cause the processors to perform a method for transmission of information from the trusted computer to a recipient computer via an untrusted computer, the method comprising:
  a) receiving a first encryption key from the recipient computer via a first communication channel, wherein the untrusted computer does not have access to the first communication channel;
  b) storing the first encryption key in association with a unique identifier corresponding to the recipient computer;
  c) receiving a request for the information from the untrusted computer via a second communication channel, the request including the unique identifier;
  d) identifying the first encryption key based on the unique identifier;
  e) encrypting the information using the first encryption key; and
  f) transmitting a message including the encrypted information to the untrusted computer via the second communication channel;
  wherein the first encryption key is associated with a second encryption key that is accessible by the recipient computer, wherein the first and second encryption keys form a symmetric key pair or an asymmetric key pair, and wherein the untrusted computer is unable to access the second encryption key,
  wherein the method further comprises, by the recipient computer:
  g) receiving the message including the encrypted information from the untrusted computer via a third communication channel that is established between the untrusted computer and the recipient computer; and
  h) decrypting the encrypted information using the second encryption key to obtain the information in an unencrypted form.

14. The non-transitory computer-readable mediums of claim 13, wherein the encrypting the information further comprises:
  digitally signing the message including the encrypted information using a signature key associated with the trusted computer.

15. The non-transitory computer-readable mediums of claim 13, wherein the instructions, when executed by the one or more processors, cause the recipient computer to, before the receiving the first encryption key:
  generating the symmetric key pair or the asymmetric key pair; and
  transmitting the first encryption key to the trusted computer via the first communication channel.

16. A system comprising a recipient computer, a trusted computer, an untrusted computer and a computer network providing a first communication channel between the trusted computer and the recipient computer and a second communication channel between the untrusted computer and the recipient computer, the trusted computer having one or more trusted processors, which, when executing instructions stored on a trusted computer-readable medium, cause the trusted computer to:
  a) receive a first encryption key from the recipient computer via a first communication channel, wherein the untrusted computer does not have access to the first communication channel;
  b) store the first encryption key in association with a unique identifier corresponding to the recipient computer;
  c) receive a request for information from the untrusted computer via a second communication channel, the request including the unique identifier;
  d) identify the first encryption key based on the unique identifier;
  e) encrypt the information using the first encryption key; and
  f) transmit a message including the encrypted information to the untrusted computer via the second communication channel;
  wherein the first encryption key is associated with a second encryption key that is accessible by the recipient computer, wherein the first and second encryption keys form a symmetric key pair or an asymmetric key pair, and wherein the untrusted computer is unable to access the second encryption key,
  wherein the recipient computer has one or more recipient processors, which, when executing instructions stored on a recipient computer-readable medium, cause the recipient computer to:
  receive the message including the encrypted information from the untrusted computer via a third communication channel that is established between the untrusted computer and the recipient computer; and
  decrypt the encrypted information using the second encryption key to obtain the information in an unencrypted form.

17. The system of claim 16, wherein to encrypt the information, the instructions when executed cause the trusted computer to:
  digitally sign the message including the encrypted information using a signature key associated with the trusted computer.

18. The system of claim 16, wherein before the trusted computer receives the first encryption key, the instructions when executed cause the recipient computer to:
  generate the symmetric key pair or the asymmetric key pair; and
  transmit the first encryption key to the trusted computer via the first communication channel.

19. The system of claim 16, wherein the instructions when executed cause the trusted computer to:
  receive a sensitive information identifier associated with the information;
  generate the request for the information, the request including the information identifier; and transmit the request for the information over the second communication channel.

\* \* \* \* \*